(12) United States Patent
Staudenmaier et al.

(10) Patent No.: US 9,395,702 B2
(45) Date of Patent: Jul. 19, 2016

(54) SAFETY CRITICAL APPARATUS AND METHOD FOR CONTROLLING DISTRACTION OF AN OPERATOR OF A SAFETY CRITICAL APPARATUS

(75) Inventors: Michael Staudenmaier, Munich (DE); Davor Bogavac, Kallered (SE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 361 days.

(21) Appl. No.: 14/130,615

(22) PCT Filed: Jul. 20, 2011

(86) PCT No.: PCT/IB2011/053235
§ 371 (c)(1),
(2), (4) Date: Jan. 2, 2014

(87) PCT Pub. No.: WO2013/011354
PCT Pub. Date: Jan. 24, 2013

(65) Prior Publication Data
US 2014/0129001 A1  May 8, 2014

(51) Int. Cl.
*B60R 22/00* (2006.01)
*G05B 9/02* (2006.01)
*G08B 21/06* (2006.01)
*B60R 21/00* (2006.01)

(52) U.S. Cl.
CPC . *G05B 9/02* (2013.01); *B60R 21/00* (2013.01); *G08B 21/06* (2013.01)

(58) Field of Classification Search
CPC .................................. G05B 9/02; B60R 21/00
USPC ....................................................... 701/45, 36
See application file for complete search history.

(56) References Cited

U.S. PATENT DOCUMENTS

| 5,361,198 | A | 11/1994 | Harmon et al. | |
|---|---|---|---|---|
| 5,517,404 | A | 5/1996 | Biber et al. | |
| 6,389,332 | B1 * | 5/2002 | Hess | G01C 21/26 701/1 |
| 6,647,301 | B1 * | 11/2003 | Sederlund | G05B 19/0428 700/108 |
| 7,050,873 | B1 | 5/2006 | Discenzo | |
| 7,881,710 | B2 | 2/2011 | Keohane et al. | |
| 2009/0309787 | A1 | 12/2009 | Gildea | |
| 2010/0293462 | A1 | 11/2010 | Bull et al. | |
| 2012/0089442 | A1 * | 4/2012 | Olsson | G06Q 30/0207 705/14.1 |

OTHER PUBLICATIONS

International Search Report and Written Opinion correlating to PCT/IB2011/053235 dated Feb. 16, 2012.

* cited by examiner

*Primary Examiner* — Luke Huynh

(57) ABSTRACT

A safety critical apparatus comprises a set of safety relevant modules; one or more comfort modules having one or more user interfaces; and a distraction controlling device arranged to adapt at least one of the one or more user interfaces to a current situation of operation of the safety critical apparatus. The distraction controlling device comprises an operator imposition estimation unit arranged to receive a set of safety relevant status signals from the set of safety relevant modules and to provide a current acceptable-distraction threshold value depending on the set of safety relevant status signals; a distraction managing unit arranged to receive one or more comfort status signals from the one or more comfort modules and to provide a current distraction value depending on the one or more comfort status signals; and a decision unit arranged to receive the current acceptable-distraction threshold value and the current distraction value and to provide one or more deactivation decision signals for the one or more user interfaces of the one or more comfort modules when the current distraction value exceeds the current acceptable-distraction threshold value.

16 Claims, 2 Drawing Sheets

SAFETY CRITICAL APPARATUS AND METHOD FOR CONTROLLING DISTRACTION OF AN OPERATOR OF A SAFETY CRITICAL APPARATUS

FIELD OF THE INVENTION

This invention relates to a safety critical apparatus and a method for controlling distraction of an operator of a safety critical apparatus.

BACKGROUND OF THE INVENTION

Today electronic consumer devices are available for accessing any piece of media for information or entertainment purposes anytime anywhere. Any media content, either previously stored or generated by the consumer device, for example music, video, games or other textual, audible or visual content, such as pictures or maps, may be provided to a user of the consumer device. A consumer device may be, for example, a portable media device, such as a smartphone, a satellite navigation system, a music or video player, a portable computer, or any other device for audibly or visually providing sound, text or other visual information to a user, either from stored data or received from a remote transmitter, such as a satellite providing positioning information or accessed via a communication network, e.g., the internet, using a wireless or wired connection. Display technology, for example, is available for providing displays of many different sizes and quality at affordable prices. This allows providing displays for multi-media services in many locations and technical apparatuses, such as, for example, inside a car, for example, within the dashboard or the centre console or at the back side of the front seat. A display may, for example, also be a head-up display (HUD) for projecting visual information on the windscreen. Wired and wireless technologies allow for spatial separation of display and processing device.

Any technical apparatus requiring a user or an operator may be enhanced with comfort functions, for example, information or entertainment functions, which are not required for the core tasks of the apparatus, but may provide stress relief, enjoyment or additional information during operational phases that require less attention by the operator. This in response may help increase effectiveness and concentration of the operator during operational phases of the apparatus that require a high level of attention by the operator. Additionally, comfort functions may allow a more impressive presentation of certain information and to combine them with additional information.

If the technical apparatus is a safety critical apparatus that requires supervision or operational input by an operator for correct and safe performance, distraction of the operator may be dangerous in certain situations where a high level of attention is necessary. A safety critical apparatus may, for example, be any technical apparatus, wherein an improper usage, unexpected failure or malfunction may result in major damage or a dangerous situation, for example, for the operator or other people. A safety critical apparatus, may, for example, be (a part of) a power plant, a chemical or other industrial plant, a railway control centre or any vehicle that carries at least an operator or moves fast enough to cause damage to the ambient environment in case of a malfunction.

For example, an operator of a vehicle may be, e.g., a driver of a car, a truck, a bike, a motor bike or a pilot of a plane, a captain of a ship or boat, or an engine driver of a train, just to name a few.

Modern cars or trucks, for example, often provide consumer devices integrated into the infrastructure of the vehicle or interfaces for connecting with portable media devices or consumer devices such as, for example, telephones, satellite navigation devices or smart phones or other media devices or consumer devices suitable for automotive infotainment.

In US 2010/0293462, a system for transferring a user interface of a portable media device to a remote device is shown. The system may be used in a car, where a user interface of the device may be integrated, for example, in the dashboard of the car.

In U.S. Pat. No. 7,881,710, a system for managing features available on a communication device, based on a travel speed detected by the portable communication device is shown. Here, the operability of features within the portable communication device is changed depending on a threshold for the speed of the device.

In US 2009/0309787, a global positioning system (GPS) device is used to determine the speed of a mobile electronic device, and the operation of the mobile electronic device is controlled in response to the speed exceeding a speed threshold.

SUMMARY OF THE INVENTION

The present invention provides a safety critical apparatus and a method for controlling distraction of an operator of a safety critical apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, as illustrated, for the understanding and appreciation of the underlying concepts of the present invention and in order not to obfuscate or distract from the teachings of the present invention.

Figure 1:
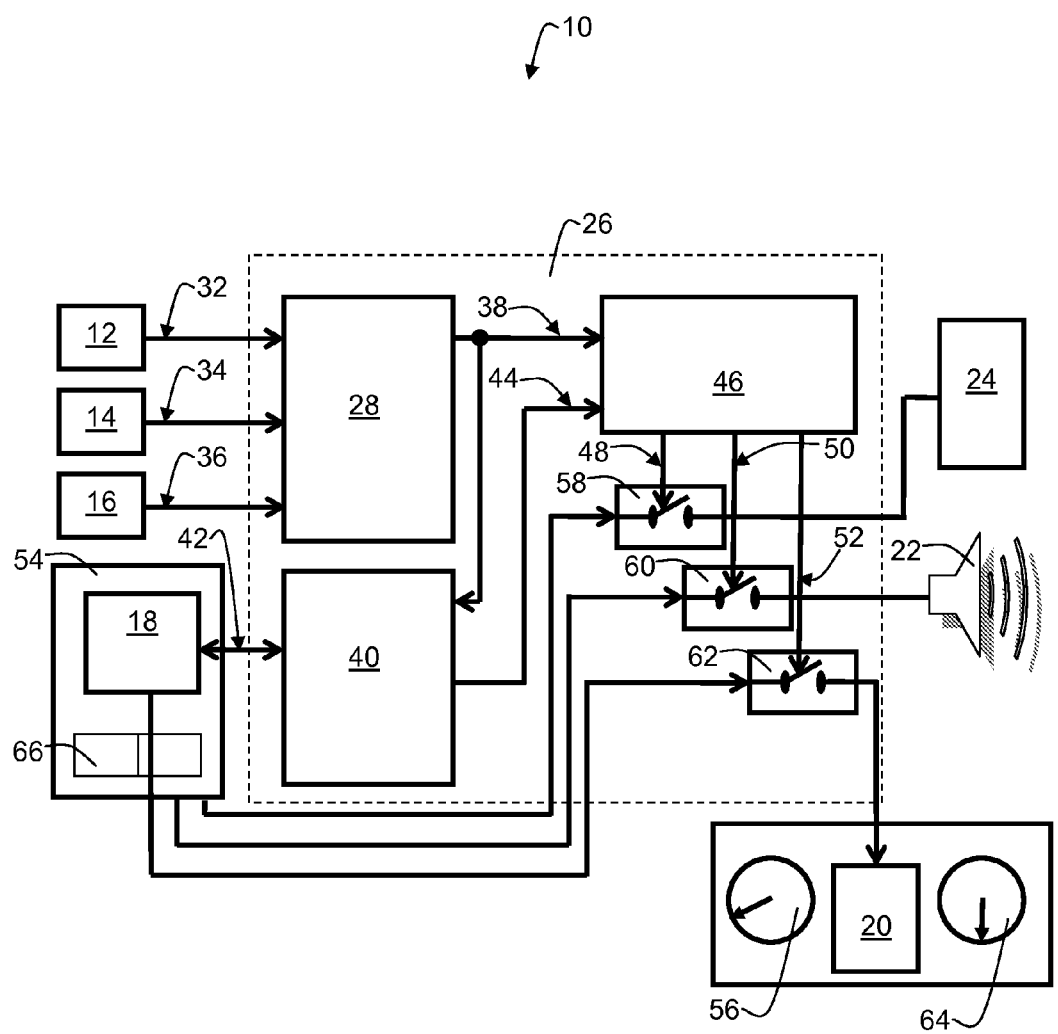
FIG. 1 schematically shows a diagram of an example of an embodiment of a safety critical apparatus.

Referring to FIG. 1, an example of an embodiment of a safety critical apparatus 10 is schematically shown. The safety critical apparatus 10 comprises a set of safety relevant modules 12, 14, 16; one or more comfort modules 18 having one or more user interfaces 20, 22, 24; and a distraction controlling device 26 arranged to adapt at least one of the one or more user interfaces 20, 22, 24 to a current situation of operation of the safety critical apparatus 10. The distraction controlling device 26 comprises an operator imposition estimation unit 28 arranged to receive a set of safety relevant status signals 32, 34, 36 from the set of safety relevant modules 12, 14, 16 and to provide a current acceptable-distraction threshold value 38 depending on the set of safety relevant status signals 32, 34, 36; a distraction managing unit 40 arranged to receive one or more comfort status signals 42 from the one or more comfort modules 18 and to provide a current distraction value 44 depending on the one or more comfort status signals 42; and a decision unit 46 arranged to receive the current acceptable-distraction threshold value 38 and the current distraction value 44 and to provide one or more deactivation decision signals 48, 50, 52 for the one or more user interfaces 20, 22, 24 of the one or more comfort modules 18 when the current distraction value 44 exceeds the current acceptable-distraction threshold value 38.

A safety relevant module 12, 14, 16 may, for example, be a safety critical system of the safety critical apparatus 10 whose possible malfunction or wrong usage or lack of supervision by the operator may directly influence a correct or safe functioning of the safety critical apparatus 10. For example, a safety critical apparatus 10 may be a vehicle, e.g. a car. A safety relevant module 12, 14, 16 of a vehicle may be, for example, a brake system or a steering wheel or other steering system, the engine or any other component of the vehicle useful for driving or driving safely. It may also comprise, for example, a seat position control system, lighting, wind screen wipers or immobilizers. A brake system may comprise, for example, an anti-lock braking system (ABS) or an electronic brakeforce distribution system (EBD). An electrical steering system may comprise, for example, an electronic stability control system (ESC), a traction control system (TCS) or anti-slip regulation system (ASR), an adaptive cruise control (ACC) system, or a forward collision warning (FCW) system, just to name a few. A safety relevant module 12, 14, 16 may comprise one or more sensor devices for detecting the current situation of operation of a safety critical system. It may be arranged to provide a safety relevant or safety critical information related to the vehicle, such as current speed, head lamp control or engine temperature or any status information provided to the user of any safety critical system of the vehicle. A safety relevant module 12, 14, 16 may also be used for acquiring safety relevant information, such as status information concerning the ambient environment, e.g., rain, darkness, speed limit signs, or concerning the driver, e.g., eye blink rate etc.

A set of safety relevant modules may comprise one or more of the safety relevant modules. A set of safety relevant status signals may comprise one or more of the safety relevant status signals.

A comfort module 18 may, for example, be a module of the safety critical apparatus 10, whose possible malfunction or wrong usage or lack of supervision by the operator does not directly influence a correct functioning of the safety critical apparatus 10 and, thereby, safety of the operator or any other person. A comfort module 18 of a vehicle may, for example, be a satellite navigation system, a radio, a telephone, or any device for playing videos or for displaying pictures or websites.

A user interface 20, 22, 24 of a comfort module 18 may, for example, be any human machine interface 24 where a user or operator can receive output data from the comfort module 18, provide input data to the comfort module 18, or both, i.e., bi-directionally interact with the comfort module 18. A user interface may comprise, for example, any display 20 or screen or a portion of a display or screen, arranged for visual data output or input or both, e.g. a touch screen. A user interface may also comprise a loud speaker 22 or a microphone, a keyboard or any button, lever, or the like. The term "user interface" may refer to the interface where output data is provided to or input data is provided by a user such as the operator. It may also refer to the hardware device for enabling the described communication with the user. Safety relevant modules 12, 14, 16 may or may not comprise user interfaces.

A distraction controlling device 26 of the safety critical apparatus 10 may be connected to one or multiple safety relevant modules 12, 14, 16 and at least one comfort module 18 and may be arranged to control a distraction of an operator of the safety critical apparatus 10, such as a distraction of a driver of a vehicle. Distraction may be influenced on the one hand by an imposition of the operator due to the current situation of operation of the safety critical apparatus 10. For example, a driver of a car may be imposed with multiple tasks and safety relevant information, wherein the actual importance of each task or provided information may depend on the situation of the car. Driving at night and/or during rain may result in a higher level of driver imposition than during daytime or on a dry road. Other safety relevant information, such as, for example, the current speed, the traffic, the driving time etc., may also influence driver imposition. A combination of more than one of these imposition factors may increase stress condition of the driver or operator and reduce the operator's ability to accept and handle distraction by any comfort function. The more attention a driver needs to spend on driving and the current situation of the car, the less a driver may be able to accept distraction by any comfort module of the car, for example, the more the driver may feel disturbed by loud music or the less the driver may be able to touch buttons on any device located on the centre console of the car.

The operator imposition estimation unit 28 may be connected to receive safety relevant status signals 32, 34, 36 from, for example, more than one safety relevant module 12, 14, 16. A signal may be a change of physical quantity carrying information, for example, a voltage level. A safety relevant status signal may carry information about an operation condition of a safety relevant module 12, 14, 16.

The operator imposition estimation unit 28 may, for example, comprise means for calculating a current acceptable-distraction threshold value 38. This value may define an actual, time-dependent value describing a level of imposition of the operator depending on the current situation of the safety critical apparatus 10 signalled to the operator imposition estimation unit 28.

The current acceptable-distraction threshold value 38, may, for example, be calculated continuously to immediately reflect any changes in the situation of the apparatus 10. For example, the traffic situation a car driver encounters may change rapidly and unexpectedly requiring a fast response by the driver.

The set of safety relevant modules may, for example, comprise a plurality of the safety relevant modules and the set of safety relevant status signals may, for example, comprise a plurality of the safety relevant status signals. The operator imposition estimation unit 28 may then be arranged to receive the plurality of safety relevant status signals 32, 34, 36 from the set of safety relevant modules and to provide the current acceptable-distraction threshold value 38 depending on the set of safety relevant status signals. The operator imposition estimation unit 28 may be arranged to generate the current acceptable-distraction threshold value 38 responsive to, for example, multiple stress factors interacting with each other. For example, driver imposition caused by vehicle speed may be different, depending on the traffic encountered, driving time, weather conditions etc. In order to calculate the current acceptable-distraction threshold value 38, the operator imposition estimation unit 28 may, for example, convert each received safety relevant status signal 32, 34, 36 into a quantification value and may apply weightings according to rules associated with each safety relevant module 12, 14, 16 reflecting an imposition of the driver and stored, for example, in the operator imposition estimation unit 28. The current acceptable-distraction threshold value 38 may then, for example, be calculated as a combination of quantification values related to more than one safety relevant module 12, 14, 16, for example, as a weighted sum. Each weighting used for calculating the acceptable-distraction value may, for example, be dependent on a residence time of a corresponding specific stress factor. For example, the weight related to a distraction or stress factor associated with a specific safety relevant module may increase with time. Just to give an example, after driving 5 h at a high speed a driver may get exhausted and may not longer be that concentrated and the ability to cope with distraction may be reduced. Other rules for calculating the current acceptable-distraction threshold value 38 may apply additionally or instead. The means for calculating the current acceptable-distraction threshold value 38 may, for example, comprise logic circuitry, a processing device, and a memory or storage device. The calculated current acceptable-distraction threshold value 38 depending on the set of safety relevant status signals 32, 34, 36 may then be provided to the decision unit 46 connected to the operator imposition estimation unit 28.

The decision unit 46 may also be connected to a distraction managing unit 40 which may be connected to receive one or more comfort status signals 42 from one or more comfort modules 18 and to provide a current distraction value 44 depending on the one or more comfort status signals to the decision unit 46. A certain comfort status signal 42 may either describe a level or value of distraction caused by the corresponding comfort module 18, or the information provided with the comfort status signal 42 may be converted into a corresponding level or value of distraction. A comfort status signal 42 may signal whether or not the comfort module 18 is in use or not, i.e., switched on or off. It may also provide more detailed information about the state of the comfort module 18. For example, it may provide a sound level of a radio, a light intensity emitted by a graphical display or a level of complexity of a display mode of an application. For example, a satellite navigation system in a vehicle may display a detailed street map or just arrows indicating a desired direction or may, additionally or alternatively, provide audible information. Or it may or may not provide additional information about the current ambient environment. The comfort modules 18 may themselves calculate and provide corresponding distraction levels or values. Or the distraction managing unit 40 may evaluate and convert the received comfort status signals 42 of each connected comfort module 18 into current distraction values associated with the connected comfort modules 18 and may calculate an overall current distraction value 44, for example by summing up the distraction value associated with the connected comfort modules 18. The sum may be calculated as a weighted sum, for example, taking into account a visibility or audibility of the certain distraction. For example, a comfort information of a comfort module 18 in a vehicle provided on a display 20 located in a dashboard of the vehicle may distract the driver differently than the same information provided to the driver on a display located on a centre console of the car not directly in viewing direction of the driver. Touching buttons located on the centre console may require the driver to use a hand. The driver may then not keep hold of the steering wheel with both hands. The same function may be activated using buttons, for example, located on the steering wheel or may be activated through voice commands of the driver.

The distraction managing unit 40 may comprise means for calculating the current distraction value 44 according to implemented calculation rules, for example, logic circuitry, a processing device, and a memory or storage device. The calculated current distraction value 44 depending on the one or more comfort status signals 42 may then be provided to the decision unit 46.

The decision unit 46 may be connected to receive the current acceptable-distraction threshold value 38 and the current distraction value 44 and to provide one or more deactivation decision signals 48, 50, 52 for the one or more user interfaces 20, 22, 24 of the one or more comfort modules 18 when the current distraction value 44 exceeds the current acceptable-distraction threshold value 38.

The current acceptable-distraction threshold value 38 may define a range for the current distraction value 44 wherein the actual level of distraction falling into this range may be accepted and may be not accepted when found to be outside of that range. When the current distraction value 44 exceeds the current acceptable-distraction threshold value 38, the current distraction value 44 may be greater than the current acceptable-distraction threshold value 38. Or, depending on the chosen implementation, the opposite or any different definition may apply. The decision unit may be arranged to provide deactivation decision signals 48, 50, 52 in order to reduce the current distraction value to an acceptable value not exceeding the threshold.

Deactivation decision signals 48, 50, 52 may, for example, be used as a trigger for deactivation of one or more of the user interfaces 20, 22, 24, e.g., by switching off user interface hardware or by stopping data provision to the selected user interfaces, for example, using switching devices 58, 60, 62. Alternatively, one or more deactivation signals may, for example, be provided directly to the user interfaces 20, 22, 24 or to the one or more comfort modules 18 which provide data to the user interfaces 20, 22, 24 or to a deactivation controller unit arranged to activate and deactivate user interfaces in response to deactivation decision signals. The decision unit 46 may, for example, select a user interface for deactivation in response to the actual distraction value corresponding to the selected user interface and a difference between the current distraction value 44 and the current acceptable-distraction threshold value 38, or it may, for example, select user interfaces depending on a ranking list previously stored in the decision unit 46. The ranking may, for example, take into account the type of user interface or, in the case of visual user interfaces, their distance from the main viewing direction of the operator. Alternatively, the decision unit 46 may, for example, arbitrarily select a user interface displaying comfort information, either one or more than one at the same time, and repeat this procedure and select more user interfaces afterwards in case the current distraction value 44 still exceeds the current acceptable-distraction threshold value 38.

The safety critical apparatus 10 may comprise one or more comfort modules 18, wherein at least one of the one or more comfort modules may be comprised in a consumer device 54. A satellite navigation system comfort module may, for example, be a dedicated consumer device or may be comprised in a consumer device, such as a smartphone. A smartphone may, for example, be able to provide this module and/or other comfort modules such as, for example, a telephone, a music or video player, or a data communication module for information retrieval from the internet. The consumer device 54 may be a part of the safety critical apparatus 10, or it may be, for example, removably connectable to the remaining part of the safety critical apparatus 10. Providing a consumer device removably connectable to the safety critical apparatus 10 may, for example, allow to easily remove the consumer device 54 and replace it with another device, for example, a newer device or to temporarily remove the consumer device 54, for example, for connecting it to a computer or other external apparatus, e.g., for software updates, loading new data, data synchronization with the external apparatus, maintenance, theft-protection, etc. The safety critical apparatus 10, for example, a vehicle may provide an interface for easily connecting a removable consumer device with the safety critical apparatus 10. The consumer device may, for example, comprise a smartphone. A smartphone may be able to provide one or often more than one comfort modules 18 suitable for usage within a vehicle. Smartphone development may progress independently of the advancements in vehicle technology and more frequent updates of smartphone hardware or software may be useful during a lifetime of a vehicle.

At least one or the one or more comfort modules 18 may, for example, be arranged to receive the acceptable-distraction threshold value 38 and to adapt at least a portion of the one or more user interfaces 20, 22, 24 depending on the acceptable-distraction threshold value 38. This may, for example, comprise to shut down one or more comfort modules 18 or disable one or more user interfaces 20, 22, 24.

At least one of the one or more comfort modules may, for example, be arranged to provide at least a part of its service, e.g., its provision of comfort information to one or more user interfaces, to at least a portion of at least one of the one or more user interfaces at more than two levels of distraction, for example, more levels than "switched on" and "switched off", wherein a selection of the level may depend on the acceptable-distraction threshold value and the current distraction value. For example, a comfort module 18 may comprise a satellite navigation system in a vehicle that may display a detailed street map when in normal mode. On reception of the current acceptable-distraction threshold value 38, the comfort module may be arranged to evaluate a difference between the current distraction value caused by the comfort module 18 and the current acceptable-distraction threshold value 38 and may decide to reduce the level of distraction generated by data output to its user interface or interfaces. The satellite navigation system may, for example, switch to a less distracting output mode requiring less attention from the operator, e.g., indicating desired direction only by an arrow instead of a map, additionally or instead, lower brightness of a used display device, or switch off any visual information display and provide only audible information.

The comfort module 18 or the consumer device 54 may be provided with one or more user interfaces, such as a user interface 66 directly connected to the device, for example, buttons and/or a display. Additionally or instead, at least one of one or more user interfaces may, for example, be a remote interface. This may allow to place the comfort module 18 at any suitable place within the safety critical apparatus 10. The driver of a car may, for example, be provided with information displayed on a display in the centre console and on the dashboard and with audio information and may be able to interact with the comfort module 18 using touch screen or buttons on the centre console, the consumer device itself, the steering wheel or using voice commands. The comfort module may be arranged to be able to decide to disable buttons located on the center console and allow user input only using buttons located, for example, close to or attached to the steering wheel, or it may be further arranged to switch to voice input. Other comfort modules may, for example, be arranged to adapt their level of distraction, e.g., by switching into a basic mode for providing only information considered to be more important. A radio may, for example, be arranged to provide only traffic information or may provide music only at reduced sound levels. A video display for the operator may be switched off or, for example, video may still be provided to displays not visible to the operator or driver but to passengers of the vehicle.

The comfort module itself or the decision unit 46 may be arranged to especially minimize distraction caused by user interfaces in viewing direction of the operator. At least one of the one or more user interfaces 20, 22, 24 may, for example, be a portion of display located close to a display portion 56, 64 arranged to display safety relevant information. A portion of a user interface 20 of a comfort module 18 may be considered close to a display portion 56, 64 arranged to display safety relevant information if both portions can be perceived by the operator simultaneously. Information provided on a display of user interface 20 of a comfort module 18 located in the dashboard of a car next to display 56, 64 providing safety relevant information such as a speedometer, may distract the driver differently than the same information provided to the driver on the display located on the centre console of the car.

In an embodiment, the safety critical apparatus 10 may comprise one or more additional distraction controlling devices 26. For example, the safety critical apparatus 10 may comprise a distraction controlling device 26 dedicated only to visual distraction by displayed information and another distraction controlling device dedicated to audio distraction, or the safety critical apparatus 10 may, for example, comprise distraction controlling devices dedicated to day and night operation or dedicated to differently experienced operators. Instead of providing different distraction controlling devices, a distraction controlling device 26 may be arranged to provide different modes of distraction handling. If the safety critical apparatus is, for example, arranged to be operated by more than one operator, e.g., a plane carrying a pilot and a co-pilot, more than one distraction controlling device may be provided.

The safety critical apparatus 10 may, for example, be a vehicle or may be comprised in a vehicle. A vehicle may be, for example, a plane, a motor bike, a bicycle, a car, a truck, a train, a ship or boat, or helicopter, just to name a few.

A safety relevant module 12, 14, 16 may, for example, be a safety critical system of the safety critical apparatus 10. A safety relevant module 12, 14, 16 may, for example, comprise one or more sensor devices for detecting the current situation of operation of a safety critical system. At least one of the set of safety relevant modules 12, 14, 16 may comprise a first sensor arranged to sense a condition of an ambient environment of the safety critical apparatus 10. The ambient environment, for example, of a vehicle may be an important factor for estimating the operation imposition. Sensors arranged to sense a condition of an ambient environment of the safety critical apparatus 10, such as a vehicle, may, for example, comprise a rain sensor, an ambient or in-vehicle temperature sensor, an ambient light sensor, an automotive radar or camera system arranged to detect traffic, distances to other vehicles, lane departure, speed limit signs, etc., just to name a few.

In an embodiment of the safety critical apparatus 10, at least one of the set of safety relevant modules may, for example, comprise a second sensor arranged to sense a condition of an operator of the safety critical apparatus 10. The physical condition of the operator may influence his or her ability to handle distraction from the main operation tasks. A tired driver may, for example, react slower to unexpected traffic situations and any distraction from driving the car may result in more dangerous situations. A sensor arranged to sense a condition of an operator may, for example, comprise the camera-based system arranged to detect an eye blink rate of the driver, a pulse sensor, a driving time clock, etc.

At least one of the set of safety relevant modules 12, 14, 16 may comprise, for example, a third sensor arranged to sense a condition of the safety critical apparatus 10. The sensor data may be related to the driver imposition. A sensor arranged to sense a condition of, for example, a vehicle may be a speed sensor, a steering activity sensor, a brake activity sensor, or an engine temperature sensor, just to name a few.

Figure 2:
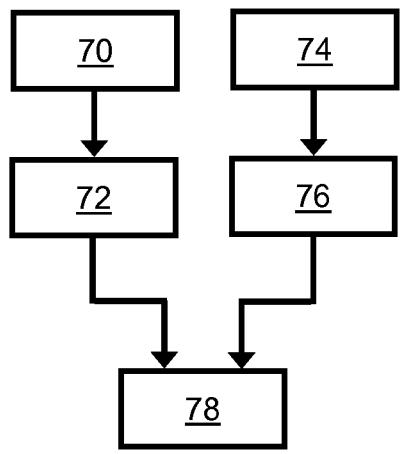
FIG. 2 schematically shows a diagram of an example of a first embodiment of a method for controlling distraction of an operator of a safety critical apparatus.

Referring to FIG. 2, a diagram of an example of a first embodiment of a method for controlling distraction of an operator of a safety critical apparatus is schematically shown. The method shown in FIG. 2 and FIG. 3 allows implementing the advantages and characteristics of the described safety critical apparatus as part of a method for controlling distraction of an operator of a safety critical apparatus.

In FIG. 2, a first embodiment of a method for controlling distraction of an operator of a safety critical apparatus comprising a set of safety relevant modules, one or more comfort modules having one or more user interfaces and a distraction controlling device arranged to adapt at least one of the one or more user interfaces to a current situation of operation of the safety critical apparatus is illustrated. The method comprises receiving 70 a set of safety relevant status signals from the set of safety relevant modules; providing 72 a current acceptable-distraction threshold value depending on the set of safety relevant status signals; receiving 74 one or more comfort status signals from the one or more comfort modules; providing 76 a current distraction value depending on the one or more comfort status signals; and providing 78 one or more deactivation decision signals for the one or more user interfaces of the one or more comfort modules when the current distraction value exceeds the current acceptable-distraction threshold value.

Figure 3:
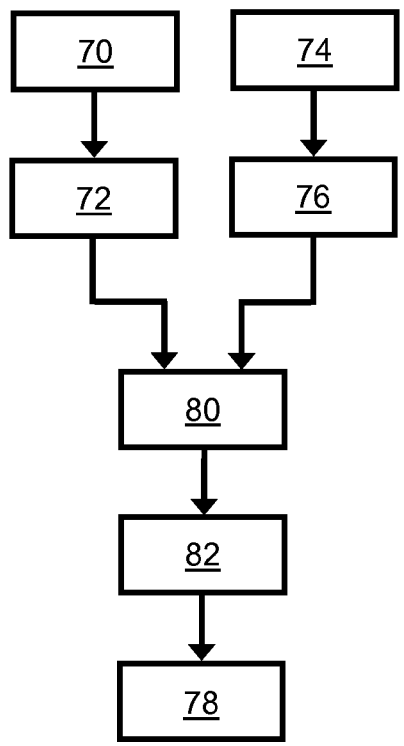
FIG. 3 schematically shows a diagram of an example of a second embodiment of a method for controlling distraction of an operator of a safety critical apparatus.

Referring to FIG. 3, a diagram of an example of a second embodiment of a method for controlling distraction of an operator of a safety critical apparatus is schematically shown. Only blocks differing from the method shown in FIG. 2 will be described. The method as illustrated above may further comprise receiving 80 the acceptable-distraction threshold value and adapting at least a portion of at least one of one or more user interfaces depending on the acceptable-distraction threshold value. The adaptation of at least a portion of at least one of the one or more user interfaces may be carried out before deciding about deactivation and providing 78 one or more deactivation decision signals.

Also, before deciding about deactivation, providing 78 one or more deactivation decision signals, the shown method may comprise providing 82 at least a part of the service of at least one of the one or more comfort modules to at least a portion of at least one of the one or more user interfaces at more than two levels of distraction, wherein a selection of the level may depend on the acceptable-distraction threshold value and the current distraction value.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the operator estimation unit 28, the distraction managing unit 40, and the decision unit 46 may be implemented as separate units or merged within one or two common units.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the operator estimation unit 28, the distraction managing unit 40, and the decision unit 46 may be implemented in a single integrated circuit. Alternatively, the examples may be implemented as any number of separate integrated circuits or separate devices interconnected with each other in a suitable manner. For example, the operator estimation unit 28, the distraction managing unit 40, and the decision unit 46 may be implemented in separate integrated circuits.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only of way of example and not as a limitation on the scope of the invention.

The invention claimed is:

1. A safety critical apparatus, comprising
a set of safety relevant modules;
one or more comfort modules having one or more user interfaces; and
a distraction controlling device arranged to adapt at least one of said one or more user interfaces to a current situation of operation of said safety critical apparatus, said distraction controlling device comprising
an operator imposition estimation unit arranged to receive a set of safety relevant status signals from said set of safety relevant modules and to provide a current acceptable-distraction threshold value depending on said set of safety relevant status signals;
a distraction managing unit arranged to receive one or more comfort status signals from said one or more comfort modules and to provide a current distraction value depending on said one or more comfort status signals; and
a decision unit arranged to receive said current acceptable-distraction threshold value and said current distraction value and to provide one or more deactivation decision signals for said one or more user interfaces of said one or more comfort modules when said current distraction value exceeds said current acceptable-distraction threshold value.

2. The safety critical system as claimed in claim 1, wherein said set of safety relevant modules comprises a plurality of said safety relevant modules and said set of safety relevant status signals comprises a plurality of said safety relevant status signals.

3. The safety critical apparatus as claimed in claim 1, wherein at least one of said one or more comfort modules is comprised in a consumer device.

4. The safety critical apparatus as claimed in claim 3, wherein said consumer device comprises a smartphone.

5. The safety critical apparatus as claimed in claim 1, wherein at least one of said one or more comfort modules is arranged to receive said acceptable-distraction threshold value and to adapt at least a portion of at least one of said one or more user interfaces depending on said acceptable-distraction threshold value.

6. The safety critical apparatus as claimed in claim 1, wherein at least one of said one or more comfort modules is arranged to provide at least a part of its service to at least a portion of at least one of said one or more user interfaces at more than two levels of distraction, wherein a selection of said level depends on said acceptable-distraction threshold value and said current distraction value.

7. The safety critical apparatus as claimed in claim 1, wherein at least one of said one or more user interfaces is a remote interface.

8. The safety critical apparatus as claimed in claim 1, wherein at least one of said one or more user interfaces is a portion of a display located close to a display portion arranged to display safety relevant information.

9. The safety critical apparatus as claimed in claim 1, comprising one or more additional distraction controlling devices.

10. The safety critical apparatus as claimed in claim 1, wherein said safety critical apparatus is a vehicle.

11. The safety critical apparatus as claimed in claim 1, wherein at least one of said set of safety relevant modules comprises a first sensor arranged to sense a condition of an ambient environment of said safety critical apparatus.

12. The safety critical apparatus as claimed in claim 1, wherein at least one of said set of safety relevant modules comprises a second sensor arranged to sense a condition of an operator of said safety critical apparatus.

13. The safety critical apparatus as claimed in claim 1, wherein at least one of said set of safety relevant modules comprises a third sensor arranged to sense a condition of said safety critical apparatus.

14. A method for controlling distraction of an operator of a safety critical apparatus comprising a set of safety relevant modules, one or more comfort modules having one or more user interfaces and a distraction controlling device arranged to adapt at least one of said one or more user interfaces to a current situation operation of said safety critical apparatus; said method comprising
 receiving a set of safety relevant status signals from said set of safety relevant modules;
 providing a current acceptable-distraction threshold value depending on said set of safety relevant status signals;
 receiving one or more comfort status signals from said one or more comfort modules;
 providing a current distraction value depending on said one or more comfort status signals; and
 providing one or more deactivation decision signals for said one or more user interfaces of said one or more comfort modules when said current distraction value exceeds said current acceptable-distraction threshold value.

15. The method as claimed in claim 14, comprising
receiving said acceptable-distraction threshold value and adapting at least a portion of at least one of said one or more user interfaces depending on said acceptable-distraction threshold value.

16. The method as claimed in claim 14, comprising
providing at least a part of the service of at least one of said one or more comfort modules to at least a portion of at least one of said one or more user interfaces at more than two levels of distraction, wherein a selection of said level depends on said acceptable-distraction threshold value and said current distraction value.

* * * * *